United States Patent

[11] 3,574,277

| [72] | Inventors | T. O. Paine<br>Deputy Administrator of the National Aeronautics and Space Administration with respect to an invention of Sherwood D. Mayall, La Crescenta, Calif. |
|---|---|---|
| [21] | Appl. No. | 813,488 |
| [22] | Filed | Apr. 4, 1969 |
| [45] | Patented | Apr. 13, 1971 |

[54] FRICTIONLESS UNIVERSAL JOINT
12 Claims, 6 Drawing Figs.

| [52] | U.S. Cl. | 64/18 |
|---|---|---|
| [51] | Int. Cl. | F16d 3/42 |
| [50] | Field of Search | 64/18; 74/5 |

[56] References Cited
UNITED STATES PATENTS

| 1,997,488 | 4/1935 | Henry | 64/18 |
| 3,301,073 | 1/1967 | Howe | 74/5.7 |
| 3,304,744 | 2/1967 | Folley | 64/18 |

Primary Examiner—Fred C. Mattern, Jr.
Assistant Examiner—Randall Heald
Attorneys—J. H. Warden, Monte F. Mott and G. T. McCoy ABSTRACT: The invention disclosed herein describes a universal joint having two coupling members pivotally connected to a gimbal plate about two axes of rotation. The pivot members that interconnect the relatively rotating members each include a pair of sleeves flexibly connected to each other by a plurality of leaf springs. The relative flexing of each pair of sleeves permits each pivot member to be fixedly mounted within bores formed within the respective coupling members and gimbal plate, thereby enabling the universal joint to operate frictionlessly without lubrication.

PATENTED APR 13 1971 3,574,277

INVENTOR.
SHERWOOD D. MAYALL
BY J. N. Warden
J. H. McCoy 3,574,277

FRICTIONLESS UNIVERSAL JOINT

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to couplings and more particularly to universal joints for connecting two displaced members.

2. Description of the Prior Art

The function of a universal joint is to provide a coupling between two displaced shafts or members for imparting a translational or rotational movement therebetween.

The two most common types of universal joints are the ball and socket type and the gimbaled type. The ball and socket type usually comprises a spherical member formed on one shaft, and a second shaft having a bearing member formed thereon which is swaged over the spherical member of the first shaft in such a manner as to form a bearing surface therebetween. Such a construction enables the two shafts to be universally turned in any direction within the structural limits of the coupling. Although these devices are used extensively, a problem is encountered over the large bearing surface involved. Such a large frictional area usually requires a large amount of lubrication for efficient operation of the coupling. Furthermore, any presence of dirt will tend to score the bearing surfaces which is also detrimental to the efficient operation of the coupling.

Another disadvantage with the ball and socket type of universal joint is that it does not provide any means for imparting a positive rotational drive between the two members. As a result, other drive means, such as gears or splines, must be incorporated into the design to impart such rotational drive. Such a modification is complex and expensive, thereby limiting the application of the device to nondriving uses.

The gimbaled universal joint usually includes a pair of forks pivotally connected to a gimbal plate about perpendicular axes to enable each fork to have 2° of rotational freedom with respect to each other. The advantages of this type of coupling are that it permits a positive rotational drive to be transferred therethrough, and since the pivot connections are of a relatively small size, less frictional area is involved.

However, various other shortcomings are inherent in universal joints of this type. Such couplings utilize solid pivots which are rotatably mounted with journals formed on the forks and the gimbal plate. This frictional engagement produces a large amount of wear on the pivots, necessitating the utilization of lubrication. In some construction, because of the oscillatory movement of the relatively rotating members, special bushings or antifriction bearings are provided over the pivots to accommodate the rocking movements of these pivots. These bushings or bearings require some initial clearances to permit proper operation of the joint without creating any binding therebetween. However, such clearances create a certain amount of backlash between the two relatively rotating members which is detrimental to the precise operation of the coupling, particularly when the coupling is used as a positioning device.

During the life of such a coupling, the friction occurring in the continued operation thereof produces wear on the bearing surfaces, which accentuates the initial clearance resulting in even more backlash. Furthermore, the presence of dirt on the joint may also accelerate bearing erosion. Lubrication helps to minimize the wear while attempting to hold the backlash to a minimum, however, there are many problems encountered with the utilization thereof. For example, nearly all lubrication is adversely affected by radiation. Such a condition can cause the bearings to freeze or otherwise bind, thereby making movement difficult. Furthermore, the requirement for constant lubrication is time consuming and expensive, which up to now, has been a necessary evil to insure the efficient operation of the coupling.

OBJECTS AND SUMMARY OF THE INVENTION

This invention obviates the above-mentioned shortcomings by providing a universal joint which includes a pair of coupling members, each member having a base portion and a pair of tines extending outwardly therefrom in a longitudinal direction. A gimbal plate is located between the coupling members and includes two sets of pivots extending outwardly therefrom. The first set of pivots extends into bores formed within each of the first pair of tines, while the second set of pivots extends into bores formed within the second pair of tines. Such a construction enables the two coupling members to pivot about the gimbal plate about the two axes of rotation. Each of the above-mentioned pivots includes a pair of relatively rotating sleeves, the first sleeve fixedly mounted within one of the respective bores and a second sleeve fixedly mounted within the gimbal plate. The first sleeve includes a cylindrical segment which extends into the interior of the second sleeve, while the second sleeve also includes a cylindrical segment which extends into the interior of the first sleeve. Leaf springs are provided to interconnect the interiors of the first and second sleeves with the interior surfaces of the second and first cylindrical segments respectively to permit relative rotation between the first and second sleeves.

An advantage of the above-mentioned universal joint is that although there is relative rotation between the three main members, the flexible pivots are fixedly mounted within the bores of these elements thereby eliminating any frictional rotation therebetween. This enables the device to operate frictionlessly with zero backlash.

Other advantages of such a coupling are that it does not require lubrication either initially or subsequently, since there are no frictional surfaces involved, and as such, the coupling pivots are insensitive to the presence of dirt.

Therefore, it is the primary object of this invention to provide a universal joint that operates frictionlessly with zero backlash and does not require any lubrication.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
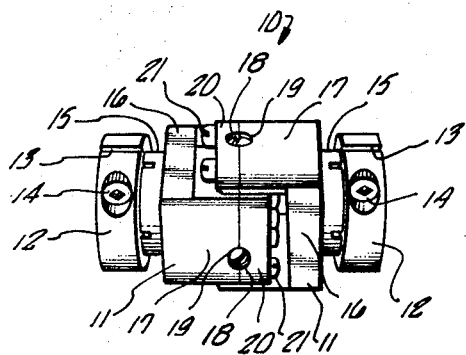
FIG. 1 is a perspective view of the universal joint in accordance with the present invention shown in its assembled form.

Referring now to the drawings, FIG. 1 shows a universal joint, generally indicated by arrow 10, in its assembled form. The universal joint 10 includes a pair of coupling members 11, each of which is adapted to be connected to a shaft by means of a hub or collar means 12. Each hub 12 is a substantially annular construction and is provided with a transverse slit 13 so that each hub 12 can be clamped to a shaft by tightening a transversally disposed bolt 14 which extends through both ends of the hub 12 to draw the ends together.

Figure 2:
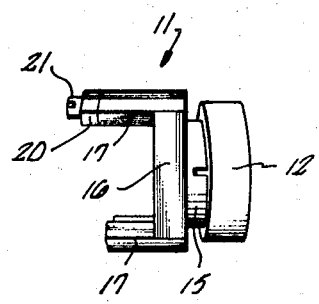
FIG. 2 is a perspective view of one of the coupling members.

As shown in FIG. 2, each coupling member 11 further includes a neck 15 which is integrally connected to one end to the hub 12, while a base plate 16 is integrally connected to the other end of the neck 15. A pair of tines 17 are formed at both ends of the base plate 16, with each tine 17 extending outwardly therefrom in a longitudinal direction. Each tine 17 is of a segmented cylindrical construction with a semicylindrical bore 19 formed at the outer end thereof. The outer end of each of the tines 17 is adapted to mate with a clamp block 20, which is attached thereto by means of a pair of threaded bolts 21. The interface surface of each of the clamp blocks 20 forms a semicylindrical bore 18 (see FIG. 1) which is adapted to register with the semicylindrical bore 19 of the respective tines 17 to form a bore for receiving a cylindrical pivot 22 which will be described in greater detail hereinafter.

As can be seen in FIG. 1, the coupling members 11 face each other with the respective tines 17 spaced at 90° intervals.

Figure 3:
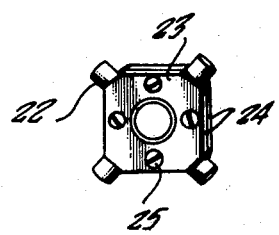
FIG. 3 is a perspective view of the gimbal plate housing a plurality of pivots.

FIG. 3 shows a gimbal plate 23 adapted to be located between the coupling members 11 within the confines of the tines 17. The gimbal plate 23 includes a pair of plates 24 connected to each other by means of a plurality of bolts 25. A plurality of bores 26 formed between the interfacing surfaces of the plates 24 at 90° intervals and are adapted to receive the pivots 22 which are fixedly mounted therein.

Figure 4:
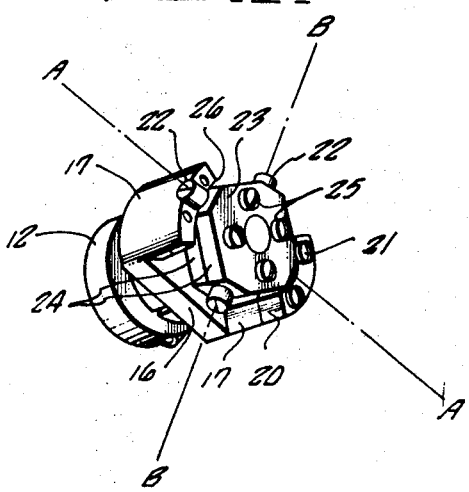
FIG. 4 is a perspective view of the gimbal plate being mounted on one of the coupling members.
Figure 6:
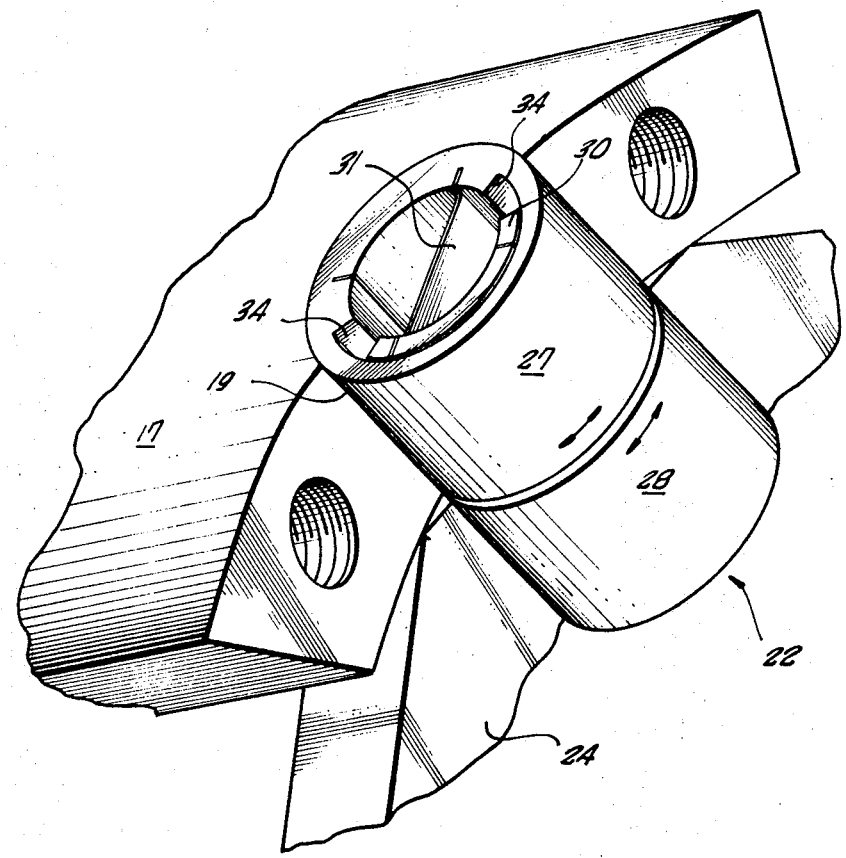
FIG. 6 is an enlarged view of one of the pivots being mounted on a coupling member and the gimbal plate.

As shown in FIGS. 4 and 6, two of the diametrically opposed pivots 22 extending out of the gimbal plate 23 are mounted onto the semicylindrical bores 19 of the tines 17. After which the clamp blocks 20, of which one is shown, are connected to the ends of the tines 17 to fixedly engage the extended ends of the two pivots 22 therein. The other diametrical pair of pivots 22 is adapted to be fixedly connected to the other tine and block assemblies of the other coupling member 11 in a manner similar to that shown in FIG. 4.

Figure 5:
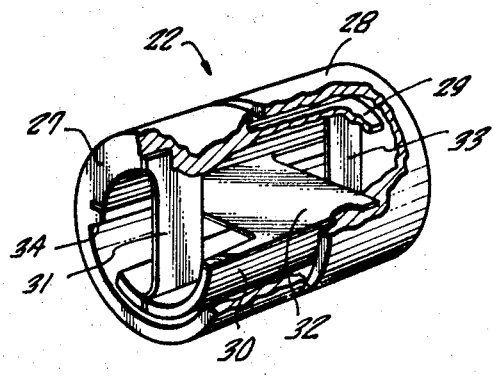
FIG. 5 is an enlarged perspective view of one of the pivots partially broken away to illustrate the interior thereof.

FIG. 5 shows an exploded view of a pivot 22, all of which are identical in structure, which includes a pair of rotatable cylindrical sleeves 27 and 28. Each sleeve has a cylindrical segment 29 and 30 extending outwardly therefrom into the interior of the adjoining sleeve. A plurality of leaf springs are located within the interior of the pivot 22 to interconnect the sleeves 27 and 28. This is accomplished by a first leaf spring 31 which is anchored to the interior surface of the sleeve 27 and the interior surface of the cylindrical segment 30. A second leaf spring 32 is positioned adjacent the first spring 31 and is perpendicular thereto to connect the central portion of the sleeve 27 and its cylindrical segment 29 to the central portion of the sleeve 28 and its cylindrical segment 30. Finally, a third leaf spring 33 is located on the other end of the second leaf spring 32 and is also perpendicular thereto to connect the interior surface of the cylindrical sleeve 28 to the interior surface of the cylindrical segment 29.

During rotation of either sleeve, the leaf springs 31, 32 and 33 twist or flex to permit relative rotation therebetween, within angular limits of approximately 30°. A pair of shoulders 34, one of which is shown in FIG. 5, are formed on substantially opposite sides of each sleeve to provide stops for limiting the maximum angular movement of the respective cylindrical segments to prevent the sleeves 27 and 28 from being rotated beyond the elastic limits of the leaf springs 31, 32 and 33. As shown in FIG. 6, the sleeve 27 of each pivot 22 is fixedly mounted within the bore formed within a respective tine 17 while each adjoining sleeve 28 is fixedly mounted within a bore formed within the gimbal plate 23. The relative flexing of each pair of sleeves 27 and 28 permits relative rotation between the tines 17 and the gimbal plate 23 without any frictional engagement on the part of the pivots.

OPERATION

As illustrated in FIG. 4, the coupling member 11 shown is adapted to pivot with respect to the gimbal plate 23 about axis A, while the other coupling member 11 is adapted to pivot with respect to the gimbal plate 23 about axis B. With the other coupling member 11 being stationary, the coupling member 11 shown can pivot about either axis A or axis B by either pivoting about the gimbal plate, as previously described, or by remaining stationary with respect to the gimbal plate to pivot with the gimbal plate about axis B. As can be seen with these 2° of freedom, each coupling member 11 can be manipulated to any desired angular position within the structural limits of the rotating capacity of each of the coupling members with respect to the gimbal plate. Therefore, although the gimbal plate 23 rotates with respect to the coupling members 11, the sleeves 27 and 28 of each of the flexible pivots 22 are fixedly mounted within the bores formed within the respective tines and gimbal plate. As a result, there is no relative motion between any of the structural members involved which would produce friction. The advantage of this type of structure is that, since the pivots are fixedly mounted within their respective bores, there is no backlash created by relative movement of these parts. Furthermore, since the pivots operate frictionlessly, they are insensitive to the presence of dirt, and hence there is no need for any lubrication. As a result the coupling is inherently resistant to any damage caused by the effects of radiation on the lubricants.

I claim:
1. A universal joint comprising:
   a first coupling member having a base portion and a first pair of tines extending outwardly therefrom in a longitudinal direction;
   a second coupling member having a base portion and a second pair of tines extending outwardly therefrom in a longitudinal direction, said first coupling member facing said second coupling member with said first and second pairs of tines perpendicularly positioned with respect to each other, each tine having means for forming a bore on the interior surface thereof;
   a gimbal plate located between the base portions of the first and second coupling members, and between the perpendicularly spaced tines, said gimbal plate having means for forming four bores on the outer periphery thereof registering with the bores of said tines; and
   a plurality of pivot means interconnecting said gimbal plate to the tines of said coupling members, each of said pivot means having a first sleeve fixedly mounted within one of the bores in said gimbal plate, a second sleeve fixedly mounted within one of said bores in said tines, and spring bias means for interconnecting said first and second sleeves, said means for forming said bores in said tines further comprising means on said tines for removably securing said second sleeves within the bores formed in said tines.

2. The invention in accordance with claim 1 wherein each of said first, and second pivot means is further defined wherein said first sleeve includes a first cylindrical segment extending into the interior of said second sleeve, and said second sleeve having a second cylindrical segment extending into the interior of said first sleeve.

3. The invention in accordance with claim 2 wherein the interior surface of said first cylindrical segment faces the interior surface of said second cylindrical segment.

4. The invention in accordance with claim 2 wherein a first leaf spring is connected to the interior of said first sleeve and said second cylindrical segment.

5. The invention in accordance with claim 4 wherein a second leaf spring is connected to the interior of said second sleeve and said first cylindrical segment, said second leaf spring being angularly displaced with respect to said first leaf spring.

6. The invention in accordance with claim 3 wherein the first leaf spring is connected to the interior of said first sleeve and the interior surface of said second cylindrical segment.

7. The invention in accordance with claim 6 wherein a second leaf spring is connected to the interior of said second sleeve and the interior surface of said first cylindrical segment, said second spring being angularly displaced from said first spring.

8. The invention in accordance with claim 1 wherein said means for removably securing said second sleeves within the bores formed in said tines comprises a clamp block removably attached to the external end thereof with said bores being formed therebetween.

9. The invention of claim 1 wherein said means for forming the bores in said gimbal plate further comprising means on said gimbal plate for removably securing said first sleeves within the bores formed in said gimbal plate.

10. The invention in accordance with claim 9 wherein said means for removably securing said first sleeves within the bores formed in said gimbal plate comprises said gimbal plate being formed by a pair of plates removably attached to each other with the plurality of bores formed therebetween.

11. A universal joint comprising:
- a first coupling member having a base portion and a first pair of tines extending outwardly therefrom in a longitudinal direction;
- a second coupling member having a base portion and a second pair of tines extending outwardly therefrom in a longitudinal direction, said first coupling member facing said second coupling member with said first and second pairs of tines perpendicularly positioned with respect to each other, each tine having a bore formed on the interior surface thereof;
- a gimbal plate located between the base portions of the first and second coupling members, and between the perpendicularly spaced tines, said gimbal plate having four bores formed on the outer periphery thereof registering with the bores of said tines, said gimbal plate comprises a pair of plates fixedly attached to each other having a plurality of bores formed therebetween; and
- a plurality of pivot means interconnecting said gimbal plate to the tines of said coupling members, each of said pivot means having a first sleeve fixedly mounted within one of the bores in said gimbal plate, a second sleeve fixedly mounted within one of said bores in said tines, and spring bias means for interconnecting said first and second sleeves.

12. A universal joint comprising:
- a first coupling member having a base portion and a first pair of tines extending outwardly therefrom in a longitudinal direction;
- a second coupling member having a base portion and a second pair of tines extending outwardly therefrom in a longitudinal direction, said first coupling member facing said second coupling member with said first and second pairs of tines perpendicularly positioned with respect to each other, each tine having a bore formed on the interior surface thereof, each tine of said first and second pair of tines includes a clamp block removably attached to the external end thereof with said bores being formed therebetween;
- a gimbal plate located between the base portions of the first and second coupling members, and between the perpendicularly spaced tines, said gimbal plate having four bores formed on the outer periphery thereof registering with the bores of said tines; and
- a plurality of pivot means interconnecting said gimbal plate to the tines of said coupling members, each of said pivot means having a first sleeve fixedly mounted within one of the bores in said gimbal plate, a second sleeve fixedly mounted within one of said bores in said tines, and spring bias means for interconnecting said first and second sleeves.